United States Patent
Eyles

[11] 3,976,561
[45] Aug. 24, 1976

[54] DESULPHURIZATION CATALYSTS AND THEIR USE

[75] Inventor: Martin Keith Eyles, Addlestone, England

[73] Assignee: The British Petroleum Company Limited, London, England

[22] Filed: Mar. 7, 1975

[21] Appl. No.: 556,306

[30] Foreign Application Priority Data
Mar. 25, 1974 United Kingdom............... 13053/74

[52] U.S. Cl. .............................................. 208/216
[51] Int. Cl.² ......................................... C10G 23/02
[58] Field of Search .................................... 208/216

[56] References Cited
UNITED STATES PATENTS

| | | | |
|---|---|---|---|
| 3,269,938 | 8/1966 | Lefrancois | 208/216 |
| 3,764,519 | 10/1973 | Meyer | 208/216 |
| 3,846,286 | 11/1974 | Phillipson | 208/216 |

Primary Examiner—George Crasanakis
Attorney, Agent, or Firm—Morgan, Finnegan, Pine, Foley & Lee

[57] ABSTRACT

Hydrocarbon fractions containing sulphur compounds are desulphurized by treatment with hydrogen over a catalyst comprising 1–10% of an iron group metal, 5–25% of a Group VIA metal and from 0.1–10% of Mg, on a refractory support.

2 Claims, 1 Drawing Figure

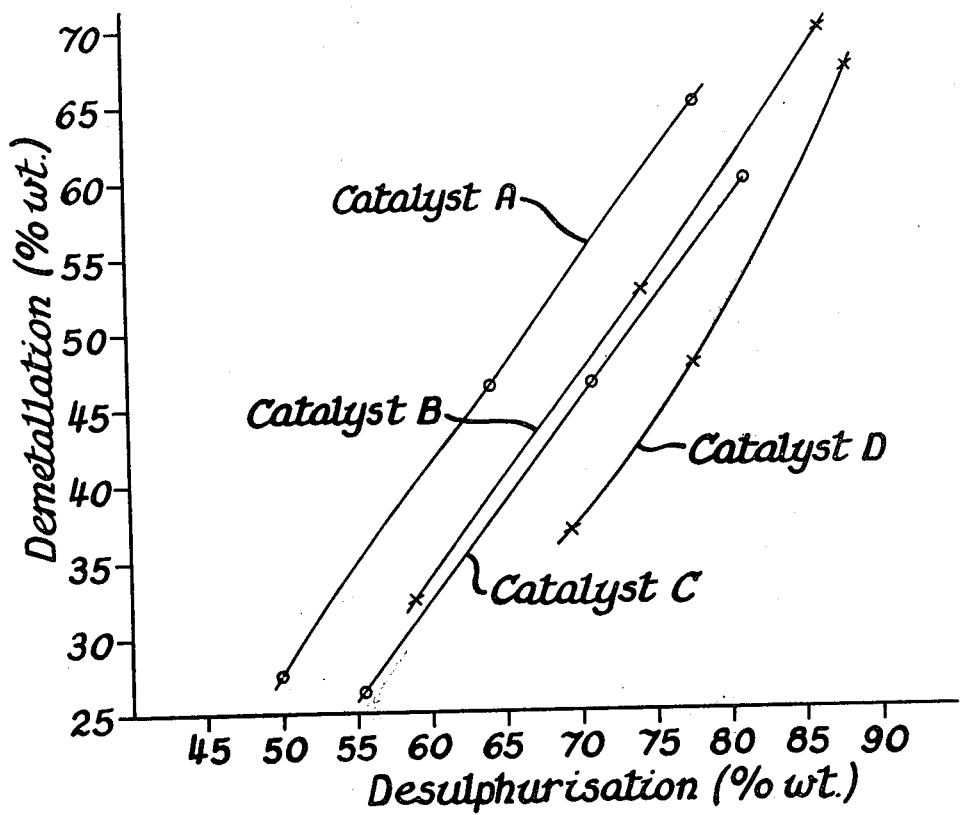

DESULPHURIZATION CATALYSTS AND THEIR USE

This invention relates to catalysts suitable for the hydrodesulphurisation of hydrocarbons, particularly petroleum hydrocarbons, and to their use.

the hydro-catalytic desulphurisation, or hydrofining, of petroleum fractions is a well established process. The catalysts used comprise a Group VIA metal compound (i.e. a compound of molybdenum, tungsten or chromium, particularly the first two) and an iron group metal compound (i.e. a compound of nickel, cobalt or iron, particularly the first two) on a refractory support. The Group VIA metal may be present in an amount of 5–25% wt. expressed as metal and the iron group metal in an amount of 1–10% wt. expressed as metal. Until recently the main interest has been in the desulphurisation of distillate petroleum fractions, but the current emphasis is very much on the desulphurisation of residues. Residues not only contain larger quantities of sulphur and nitrogen compounds than distillate fractions, but they also contain asphaltenes and, frequently, metal compounds, particularly compounds of vanadium and nickel, and it is accepted that they are much more difficult feedstocks for hydro-desulphurisation processes. A good residue desulphurisation catalyst requires not only high activity for desulphurisation but also good selectivity to minimise hydrogen consumption and the formation of carbonaceous deposits, and a high tolerance for carbonaceous and/or metal deposits.

It has now been found that the addition of a compound of magnesium to a desulphurisation catalyst gives improved results in residue desulphurisation.

According to one aspect of the present invention therefore, a catalyst suitable for the hydro-desulphurisation of hydrocarbons comprising from 1–10% wt. of an iron group metal, and from 5–25% wt. of a Group VIA metal (as hereinbefore defined) on a refractory support is characterised in that it contains also from 0.1 to 10% wt. of magnesium or an alkaline earth metal, all weights being by weight of total catalyst.

Magnesium is the preferred promoting metal but the alkaline earth metals (i.e. calcium, strontium and barium) may also be suitable.

The quantities above are expressed as elements by weight of total catalyst but the elements will normally be present as compounds, particularly the oxides or sulphides. Preferred combinations are cobalt and molybdenum, nickel and molybdenum, or nickel, cobalt and molybdenum all originally present as oxides or sulphides and nickel tungsten sulphide. If two or more iron group metals are used the total iron group metal content remains in the range 1–10% wt. The preferred amount of magnesium or alkaline earth metal is from 1 to 8% wt.

The refractory support may be one or more oxides of elements of Groups III or IV of the Periodic Table, particularly alumina, silica, or silica-alumina. A single oxide, particularly alumina, is preferred to limit side-reactions. The alumina may contain up to 5% wt. of silica or phosphate to stabilise it and/or give the required pore characteristics.

Sometimes, however, when treating petroleum residues, some hydrocracking and the production of lower-boiling products may be desirable in which case a support formed from two or more oxides would be preferred, particularly supports of 5–95% wt. alumina and 95–5% wt. silica.

The method of preparation of the catalyst as regards the iron group metal, the Group VIA metal and the support may follow standard practice. Thus the metals may be added by simultaneous or sequential impregnation with suitable salt solutions, followed by drying, calcination, and, if necessary, pre-sulphiding.

The magnesium or alkaline earth metal may also be added as a salt, for example, a sulphate, nitrate, acetate of halide. These salts may be used in aqueous or alcoholic solutions. The magnesium or alkaline earth metal may be added at any convenient stage in the catalyst preparation, and may, if desired, be added to a pre-formed known desulphurisation catalyst.

According to another aspect of the invention a process for the hydrocatalytic desulphurisation of hydrocarbon fractions containing sulphur compounds comprises contacting the fraction at elevated temperature and pressure and in the presence of hydrogen with a catalyst comprising from 1–10% wt. of an iron group metal, from 5–25% wt. of a Group VIA metal (as hereinbefore defined) and from 0.1 to 10% wt. of magnesium or an alkaline earth metal on a refractory support, all weights being by weight of total catalyst.

The feedstocks may be any hydrocarbon fractions, particularly petroleum fractions. They may be atmospheric distillate fractions, i.e., fractions boiling in the range 50° – 350°C, but, preferably, they contain at least 25% wt. of material boiling above 350°C and more particularly at least 25% wt. of material boiling above 550°C. Particularly preferred feedstocks are atmospheric residues boiling above 350°C and crude oils may also be treated. Depending on the original crude oil source the feedstocks may contain 1–8% wt. sulphur, 0–1% wt. nitrogen, 10–1000 ppm by weight of metals and 1–20% wt. of asphaltenes. The preferred feedstocks are straight run fractions, but products from previous treatment processes may also be used, e.g., vis-breaker distillates or residues, and cat cracker cycle oils.

The feedstock may also, if desired, be given a preliminary treatment to remove asphaltenes and/or metal compounds.

The desulphurisation process conditions may be chosen from the following ranges:

|  |  | Broad range | Preferred range |
|---|---|---|---|
| Temperature | °C | 150–600 | 250–500 |
| Pressure | bars (ga) | 10–500 | 100–300 |
| Space velocity | v/v/hr | 0.1–10 | 0.25–2.5 |
| Gas rate | $m^3$ of $H_2/m^3$ | 100–3600 | 500–1800 |

These variables may be adjusted in known manner depending on the level of desulphurisation required.

In residue desulphurisation, particular attention has been paid in recent years to the physical, as well as the chemical, characteristics of the catalysts used. The general consensus of opinion is that microporous catalysts, i.e., catalysts with a preponderance of pores below 300 A diameter combine good desulphurisation activity with reasonable life because there is less tendency for these microporous catalysts to pick up metals and asphaltenes present in the feed. Catalysts containing pores above 300 A diameter tend to pick up metal and to have a lower desulphurisation activity. This may be desirable in a preliminary reactor or guard chamber but is less desirable in a main desulphurisation chamber.

The invention is illustrated by the following examples and the accompanying drawing.

EXAMPLE 1

The catalyst used was a commercial catalyst of cobalt and molybdenum oxides on alumina having a high micropore volume (pores below 300 A diameter) and low macropore volume (pores above 300 A diameter). 100 g of this catalyst was added to a solution of 45.5 g of magnesium acetate, $Mg(CH_3COO)_2.4H_2O$, in 150 ml of deionised water. The mixture was left standing at ambient temperature for 24 hours, then filtered. The catalyst was then washed with water, dried at 120°C for 16 hours and finally calcined at 500°C for 2 hours.

Inspection data on the original CoMo catalyst and the magnesium impregnated CoMo catalyst are given below.

| Stable at 550°C | | Catalyst A<br>CoMo catalyst | Catalyst B<br>CoMo catalyst + Mg |
|---|---|---|---|
| CoO | % wt | 4.15 | 3.81 |
| $MoO_3$ | % wt | 13.30 | 13.20 |
| Mg | % wt | — | 2.0 |
| Surface are (B.E.T.) | m²/g | 334 | 356 |
| Micropore volume (<300 A) | ml/g | 0.526 | 0.579 |
| Macropore volume (>300 A) | ml/g | 0.103 | 0.037 |
| Average micro-pore diameter | A | 63 | 65 |

It will be seen that the addition of magnesium has reduced the macropore volume.

The two catalysts were tested for residue desulphurisation using an atmospheric residue from a Kuwait crude oil having the following inspection data.

| Sulphur | % wt. | 3.87 |
|---|---|---|
| Nitrogen | ppm wt. | 2070 |
| Ni | ppm wt. | 16 |
| V | ppm wt. | 49 |
| Na | ppm wt. | 28 |
| Fe | ppm wt. | 3.5 |
| Asphaltenes | % wt. | 2.2 |
| Specific gravity at 60°F/60°F | | 0.9610 |
| Conradson Carbon Residue % wt. | | 9.8 |

Desulphurisation Activity Test 100 mls of each of the catalysts were tested under the same conditions.

a. Presulphiding

Feedstock — gas oil containing added $CS_2$ to give 2.0% wt. sulphur

| Pressure | 34.5 bars (ga) |
|---|---|
| Space velocity | 1.0 v/v/hr |
| Hydrogen rate | 170 m³/m³ |
| Initial temperature | 140°C |

The temperature was raised 20°C per hour to 320°C and held at 320°C for 1 hour.

b. Accelerated Ageing Test

The feedstock was changed to the atmospheric residue and the temperature raised from 320 to 400°C at 20°C/hour. The test conditions were:

| Temperature | 400°C |
|---|---|
| Pressure | 103 bars (ga) |
| Space velocity | 1 v/v/hr |
| Hydrogen rate | 840 m³/m³ |
| Time | 10 days | c. Temperature response test

| Temperature | 370°C, 395°C and 420°C |
|---|---|
| Pressure | 103 bars (ga) |
| Space velocity | 0.5 v/v/hr |
| Hydrogen recycle rate | 840 m³/m³ |

Operation at each of the temperatures was carried out for 24 hours. Product obtained from the first 16 hours was discarded and product collected during the final eight hours was analysed.

The results obtained are set out in the following Table 1.

TABLE 1

| | | Catalyst A<br>CoMo Catalyst | | | Catalyst B<br>CoMo/Mg Catalyst | | |
|---|---|---|---|---|---|---|---|
| Accelerated Ageing Test | | | | | | | |
| % wt desulphurisation after | | | | | | | |
| 2 days on stream | | 60.7 | | | 66.0 | | |
| 5 days on stream | | 56.3 | | | 63.6 | | |
| 10 days on stream | | 52.2 | | | 59.4 | | |
| Temperature Response Test | | | | | | | |
| Catalyst Temperature | °C | 370 | 395 | 420 | 370 | 395 | 420 |
| Product Analysis:- | | | | | | | |
| SG at 60°F/60°F | | 0.9375 | 0.9280 | 0.9074 | 0.9322 | 0.9196 | 0.8994 |
| Sulphur | % wt | 1.94 | 1.40 | 0.85 | 1.59 | 1.00 | 0.52 |
| Conradson Carbon Residue | % wt | 7.1 | 6.0 | 4.2 | 7.0 | 5.5 | 3.4 |
| Asphaltenes | % wt | 1.7 | 1.6 | 1.4 | 2.0 | 1.8 | 1.5 |
| Vanadium | ppm wt | 35 | 26 | 17 | 33 | 23 | 15 |
| Nickel | ppm wt | 12 | 9 | 6 | 11 | 8 | 5 |

Example 2

110 g of a CoMo alumina catalyst was added to a solution of 56.3 g of magnesium sulphate, $MgSO_4.7H_2O$ in 200 ml of deionised water. The mixture was left standing at ambient temperature for 7 days, then filtered. The catalyst was then washed with water, dried at 120°C for 16 hours and finally calcined at 500°C for 2 hours.

Inspection data on the original CoMo catalyst and the magnesium impregnated CoMo catalyst are given below.

| Stable at 550°C | | Catalyst C CoMo Catalyst | Catalyst D CoMo/Mg Catalyst |
| --- | --- | --- | --- |
| CoO | % wt | 3.43 | 3.31 |
| $MoO_3$ | % wt | 13.0 | 12.0 |
| Mg | % wt | — | 2.34 |
| Surface area (B.E.T.) | m²/g | 338 | 296 |
| Micropore (< 300 A) volume | ml/g | 0.585 | 0.514 |
| Macropore (> 300 A) volume | ml/g | 0.011 | 0.009 |
| Average micropore diameter | A | 69 | 69 |

Activity Test Details

Details of the feedstock presulphiding, accelerated ageing test and temperature response test are exactly as for Example 1, except that a once-through unit was used for Example 2. Therefore, an exit gas rate of 180 m³/m³ was used for the presulphiding step and 900 m³/m³ of once-through hydrogen was used during the accelerated ageing and temperature response tests.

Data from both the accelerated ageing tests and the temperature response tests are given in Table 2.

TABLE 2

| | | Catalyst C CoMo Catalyst | | | Catalyst D CoMo/Mg Catalyst | | |
| --- | --- | --- | --- | --- | --- | --- | --- |
| Accelerated Ageing Test | | | | | | | |
| % wt desulphurisation after | | | | | | | |
| 2 days on stream | | 67.2 | | | 74.9 | | |
| 5 days on stream | | 65.1 | | | 74.2 | | |
| 10 days on stream | | 59.9 | | | 73.1 | | |
| Temperature Response Test | | | | | | | |
| Catalyst temperature | °C | 370 | 395 | 420 | 370 | 395 | 420 |
| Product Analysis:- | | | | | | | |
| SG at 60°F/60°F | | 0.9307 | 0.9151 | 0.8955 | 0.9230 | 0.9113 | 0.8840 |
| Sulphur | % wt | 1.73 | 1.13 | 0.73 | 1.19 | 0.86 | 0.45 |
| Conradson carbon residue | % wt | 6.8 | 5.4 | 3.9 | 5.9 | 4.9 | 2.8 |
| Asphaltenes | % wt | 1.9 | 1.8 | 1.7 | 1.9 | 1.7 | 1.4 |
| Vanadium | ppm wt | 36 | 26 | 19 | 30 | 25 | 15 |
| Nickel | ppm wt | 12 | 9 | 7 | 11 | 9 | 6 |

The examples show that the addition of magnesium gives increased activity, evinced by higher desulphurisation in both the accelerated ageing test and at each individual temperature in the temperature response tests.

Magnesium also improves catalyst stability as shown by lower deactivation rates in the accelerated ageing test.

The accompanying figure was obtained by plotting desulphurisation and demetallation for each catalyst for each temperature in the temperature response test. Demetallation is calculated as removal of nickel plus vanadium.

Addition of magnesium reduces the level of demetallation. In each example, the magnesium doped catalyst shows lower demetallation for a given level of desulphurisation.

I claim:

1. A process for the hydrocatalytic desulphurisation of hydrocarbon fractions containing sulphur compounds and containing at least 25% by weight of material boiling above 550°C. which process comprises contacting a hydrocarbon fraction of the aforesaid type with hydrogen and with a catalyst comprising from 1 to 10% weight of an iron group metal, from 5–25% of a metal selected from the group consisting of molybdenum, chromium and tungsten, and from 0.1 to 10% weight of an alkaline earth metal on a carrier selected from the group consisting of silica, alumina and silica-alumina, all weights being be weight of total catalyst, contacting being carried out at a temperature in the range 150° to 600°C., a pressure in the range 10 to 500 bars gauge, a liquid hourly space velocity in the range 0.1 to 10 and a hydrogen gas flow rate in the range from 100 to 3600 m³/m³.

2. A process for the hydrocatalytic desulphurisation of hydrocarbon fractions containing sulphur compounds and containing at least 25% by weight of material boiling above 550°C. which process comprises contacting a hydrocarbon fraction of the aforesaid type with hydrogen and with a catalyst comprising from 1 to 10% weight of an iron group metal, from 5–25% of a metal selected from the group consisting of molybdenum, chromium and tungsten, and from 0.1 to 10% weight of magnesium on a carrier selected from the group consisting of silica, alumina and silica-alumina, all weights being by weight of total catalyst, contacting being carried out at a temperature in the range 150° to 600°C., a pressure in the range 10 to 500 bars gauge, a liquid hourly space velocity in the range 0.1 to 10 and a hydrogen gas flow rate in the range from 100 to 3600 m³/m³.

* * * * *